United States Patent
Baxter et al.

(10) Patent No.: US 10,537,823 B2
(45) Date of Patent: Jan. 21, 2020

(54) METHOD FOR REMOVAL OF CARBON DIOXIDE FROM A CARRIER LIQUID

(71) Applicants: Larry Baxter, Orem, UT (US); Christopher Hoeger, Provo, UT (US); Eric Mansfield, Spanish Fork, UT (US); Kyler Stitt, Lindon, UT (US); Stephanie Burt, Provo, UT (US); Nathan Davis, Bountiful, UT (US)

(72) Inventors: Larry Baxter, Orem, UT (US); Christopher Hoeger, Provo, UT (US); Eric Mansfield, Spanish Fork, UT (US); Kyler Stitt, Lindon, UT (US); Stephanie Burt, Provo, UT (US); Nathan Davis, Bountiful, UT (US)

(73) Assignee: Hall Labs LLC, Provo, UT (US)

(*) Notice: Subject to any disclaimer, the term of this patent is extended or adjusted under 35 U.S.C. 154(b) by 298 days.

(21) Appl. No.: 15/433,185

(22) Filed: Feb. 15, 2017

(65) Prior Publication Data
US 2018/0231307 A1    Aug. 16, 2018

(51) Int. Cl.
*B01D 1/00*    (2006.01)

(52) U.S. Cl.
CPC ...................... *B01D 1/00* (2013.01)

(58) Field of Classification Search
CPC ...... B01D 1/00; B01D 19/0036; B01D 19/00; B01D 1/0041; Y02C 10/12
See application file for complete search history.

(56) References Cited

U.S. PATENT DOCUMENTS

| | | | | |
|---|---|---|---|---|
| 2,649,166 A | * | 8/1953 | Eck | B01D 53/62 95/166 |
| 3,130,026 A | * | 4/1964 | Becker | F25J 3/0209 62/634 |
| 3,417,572 A | * | 12/1968 | Pryor | C01B 17/167 62/634 |
| 3,498,067 A | * | 3/1970 | Ranke | F25J 3/0219 62/635 |
| 3,594,985 A | * | 7/1971 | Ameen | B01D 53/1468 95/163 |
| 3,643,451 A | * | 2/1972 | Foucar | F25J 3/0266 62/623 |
| 3,664,091 A | * | 5/1972 | Hegwer | B01D 53/526 95/161 |
| 3,852,408 A | * | 12/1974 | Ewan | B01D 53/501 423/243.1 |
| 4,350,511 A | * | 9/1982 | Holmes | B01D 3/146 62/632 |
| 4,449,994 A | * | 5/1984 | Hegarty | F25J 3/0219 62/622 |
| 4,609,388 A | * | 9/1986 | Adler | C07C 7/14 62/532 |

(Continued)

*Primary Examiner* — Ljiljana V. Ciric

(57) ABSTRACT

A method for removing carbon dioxide from a carrier liquid using a heat exchanger. A carrier liquid, containing carbon dioxide, is heated through the heat exchanger, causing the carbon dioxide to vaporize. The carrier liquid and the carbon dioxide gas pass to a liquid removal vessel. The carrier liquid is removed and the carbon dioxide gas is compressed. The compressed carbon dioxide gas is provided to the heat exchanger, cooling the carbon dioxide gas opposite the carrier liquid, producing a carbon dioxide liquid.

20 Claims, 4 Drawing Sheets

(56) References Cited

U.S. PATENT DOCUMENTS

| | | | | |
|---|---|---|---|---|
| 4,977,745 A * | 12/1990 | Heichberger | | F25J 3/0257 60/648 |
| 5,819,555 A * | 10/1998 | Engdahl | | F25J 3/061 62/637 |
| 7,594,414 B2 * | 9/2009 | Wilding | | F25J 1/0262 62/611 |
| 7,892,324 B2 * | 2/2011 | Frydman | | B01D 53/1462 95/160 |
| 8,435,325 B2 * | 5/2013 | Akiyama | | B01D 53/1425 95/16 |
| 8,518,155 B2 * | 8/2013 | Palamara | | B01D 19/0036 95/163 |
| 8,535,417 B2 * | 9/2013 | Shah | | B01D 53/002 95/103 |
| 8,585,802 B2 * | 11/2013 | Keller | | C01B 3/501 95/45 |
| 8,696,798 B2 * | 4/2014 | Mak | | B01D 53/1425 95/172 |
| 9,149,761 B2 * | 10/2015 | Northrop | | B01D 53/1462 |
| 9,423,174 B2 * | 8/2016 | Northrop | | C10L 3/10 |
| 9,829,246 B2 * | 11/2017 | Northrop | | C10L 3/102 |
| 9,874,395 B2 * | 1/2018 | Valencia | | F25J 1/0022 |
| 9,903,648 B2 * | 2/2018 | Briglia | | F25J 3/0223 |
| 9,964,352 B2 * | 5/2018 | Oelfke | | B01D 3/36 |
| 10,222,121 B2 * | 3/2019 | Cullinane | | B01D 7/02 |
| 10,344,231 B1 * | 7/2019 | Robinson | | C07C 1/0485 |
| 10,365,037 B2 * | 7/2019 | Valencia | | F25J 3/0295 |
| 10,408,534 B2 * | 9/2019 | Kaminsky | | F25J 1/00 |
| 2007/0221541 A1 * | 9/2007 | McClanahan | | C07B 63/00 208/263 |
| 2009/0101012 A1 * | 4/2009 | Gal | | B01D 53/1406 95/225 |
| 2010/0280288 A1 * | 11/2010 | Joshi | | C07C 29/1518 568/895 |
| 2016/0199808 A1 * | 7/2016 | Yoshikawa | | B01J 20/08 96/146 |
| 2017/0333831 A1 * | 11/2017 | Chen | | B01D 19/0015 |
| 2018/0209729 A1 * | 7/2018 | Baxter | | F25J 3/067 |
| 2018/0243680 A1 * | 8/2018 | Naito | | B01D 53/261 |
| 2018/0252469 A1 * | 9/2018 | Baxter | | B01D 53/002 |

* cited by examiner

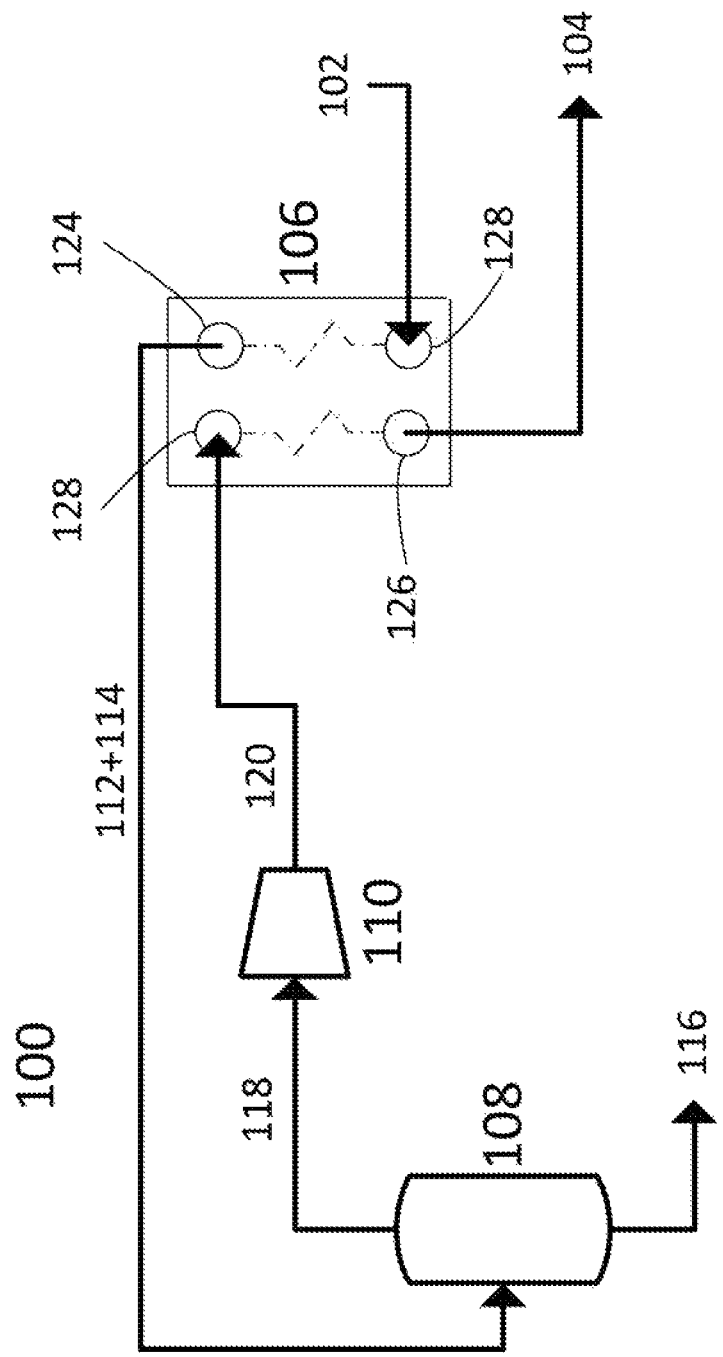

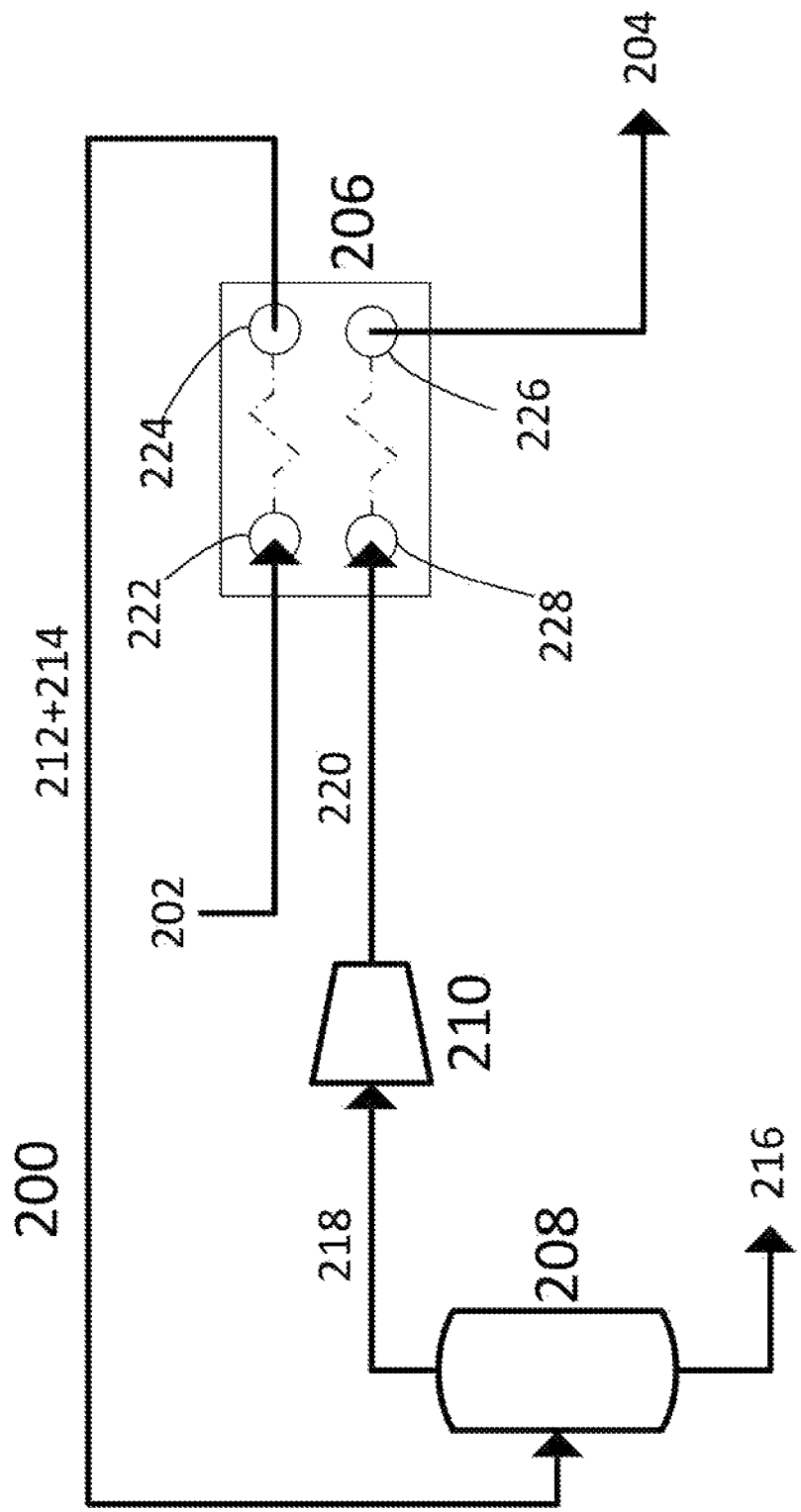

METHOD FOR REMOVAL OF CARBON DIOXIDE FROM A CARRIER LIQUID

This invention was made with government support under DE-FE0028697 awarded by The Department of Energy. The government has certain rights in the invention.

BACKGROUND

Field of the Invention

This invention relates generally to the field of removal of impurities from liquids. Our immediate interest is in removal of carbon dioxide from carrier liquids in cryogenic applications, but this process has much broader application.

Related Technology

The removal of impurities from liquids is a need that has existed since pre-history. In modern times, reliable technologies like distillation are used for broad applications. However, the energy requirements of classic techniques are sometimes cost prohibitive for removal of impurities that are more miscible or soluble in the liquid. The relatively new field of cryogenics has begun to have impact on this field, but the great challenge of energy efficiently and cost effectively removing carbon dioxide from liquids has not been solved. With the rising demand for sequestration of carbon dioxide, new methods are needed that address any limitations that exist.

United States patent publication number 2007/0221541 to McClanahan et al. teaches a multi-stage cryogenic acid gas removal. This disclosure is pertinent and may benefit from semi-continuous heat exchanger methods disclosed herein and is hereby incorporated for reference in its entirety for all that it teaches.

United States U.S. Pat. No. 4,609,388 to Adler et al. teaches a gas separation process. This disclosure is pertinent and may benefit from semi-continuous heat exchanger methods disclosed herein and is hereby incorporated for reference in its entirety for all that it teaches.

United States U.S. Pat. No. 3,664,091 to Hegwer teaches a process for the removal of acid gas from natural gases employing physical absorption using a solvent which absorbs acid gas. United States U.S. Pat. No. 3,594,985 to Ameen et al. to Ameen, and United States U.S. Pat. No. 3,498,067 to Ranke also teach a similar absorption procedure. These disclosures are pertinent and may benefit from semi-continuous heat exchanger methods disclosed herein and are hereby incorporated for reference in its entirety for all that it teaches.

United States patent publication number 2009/0101012 to Gal et al. teaches an ammonia based CO2 capture system, using multiple absorption stages. This disclosure is pertinent and may benefit from semi-continuous heat exchanger methods disclosed herein and is hereby incorporated for reference in its entirety for all that it teaches.

United States U.S. Pat. No. 3,852,408 to Ewan et al., teaches a process for the removal of sulfur dioxide from carrier gases. This disclosure is pertinent and may benefit from semi-continuous heat exchanger methods disclosed herein and is hereby incorporated for reference in its entirety for all that it teaches.

SUMMARY

A method for removing carbon dioxide from a carrier liquid is disclosed. The method comprises, first, providing a heat exchanger with a cooling side and a heating side to conduct a heat exchange process between the carrier liquid and a compressed carbon dioxide gas. The cooling side of the heat exchanger having a cooling input port and a cooling output port. The heating side of the heat exchanger having a heating input port and a heating output port. Second, conveying the carrier liquid to the heating input port. The carrier liquid is at a first temperature and a first pressure where the carbon dioxide is a carbon dioxide liquid. Third, heating the carrier liquid through the heat exchanger, causing the carbon dioxide and a portion of the carrier liquid to vaporize as the carrier liquid and the carbon dioxide are brought to a second temperature where the carbon dioxide vaporizes to a carbon dioxide gas. Fourth, passing the carrier liquid and the carbon dioxide gas through the heating output port to a feed inlet of a liquid removal vessel. Fifth, condensing the portion of the carrier liquid that was vaporized and removing the carrier liquid from the bottom of the liquid removal vessel. Sixth, compressing the carbon dioxide gas from the liquid removal vessel through a compression process by raising the carbon dioxide gas to a second pressure at which the carbon dioxide gas is now the compressed carbon dioxide gas. Seventh, sending the compressed carbon dioxide gas to the cooling input port. Eighth, cooling the compressed carbon dioxide gas by the heat exchange process with the carrier liquid through the heat exchanger, bringing the compressed carbon dioxide gas to a third temperature, by which process the carbon dioxide gas cools to a pure carbon dioxide liquid. In determining the temperatures and pressures, a pressure-temperature curve for carbon dioxide is required. The first temperature and the first pressure are located in a liquid phase area of the pressure-temperature curve for carbon dioxide. The second temperature is shifted from the first temperature to the second temperature, the second temperature being higher than the first temperature, and the combination of the first pressure and the second temperature being located in a gas phase area of the pressure-temperature curve for carbon dioxide that also allows for the compression from the first pressure to the second pressure to keep the carbon dioxide gas as a gas. The third temperature is lower than the second temperature, with the third temperature and second pressure in the liquid phase area. The compression process is sized to allow the heat exchange process to be efficient and to avoid an inflection region that occurs between a heat-temperature curve of the cooling side of the heat exchanger and a heat-temperature curve of the heating side of the heat exchanger. In this manner, carbon dioxide is removed from the carrier liquid.

The heat exchanger may be operated as a counter-current or co-current heat exchanger. The heat exchanger may be a brazed plate, aluminum plate, shell and tube, plate, plate and frame, plate and shell, spiral, or plate fin style heat exchanger. In one embodiment, the heat exchanger may be a shell and tube style heat exchanger containing a shell enclosing a tube, wherein the tube has a varying diameter. Any surface of the heat exchanger exposed to the compressed carbon dioxide gas or the carrier liquid may be constructed of aluminum, stainless steel, polymers, carbon steel, ceramics, polytetrafluoroethylene, polychlorotrifluoroethylene, natural diamond, man-made diamond, chemical-vapor deposition diamond, polycrystalline diamond, or combinations thereof.

The liquid removal vessel may contain packing materials. The packing materials may comprise structured or unstructured packing in the top third of the liquid removal vessel. In the case of the liquid removal vessel containing packing materials in the top third, the feed inlet of the liquid removal vessel may be no higher than halfway up the liquid removal vessel. The packing materials may be made of stainless steel, hastelloy, titanium, nickel, copper, carbon steel, alumina, ceramics, polypropylene, polyethylene, polyvinylchloride, polyvinylidene fluoride, polyfluoroethylenepropylene, ethylene chlorotrifluoroethylene, polytetrafluoroethylene, polychlorotrifluoroethylene, natural diamond, man-made diamond, chemical-vapor deposition diamond, polycrystalline diamond, or combinations thereof. Any surface of the liquid removal vessel exposed to the carrier liquid and the carbon dioxide gas may be constructed of aluminum, stainless steel, polymers, carbon steel, ceramics, polytetrafluoroethylene, polychlorotrifluoroethylene, natural diamond, man-made diamond, chemical-vapor deposition diamond, polycrystalline diamond, or combinations thereof.

The carrier liquid may be 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

The first temperature may be between −145 C and −119 C, the second temperature may be between 10 C and 45 C higher than the first temperature, and the third temperature is between the first temperature and the second temperature.

The compression process may be conducted by a single compressor, or by two compressors in series. The compressor or compressors may be a reciprocating, scroll, screw, rotary, sorbent, or centrifugal style compressor. In the case of two compressors in series, the two compressors may be different styles or the same style. Any surface of the compressor or compressors exposed to the carbon dioxide gas may be constructed of stainless steel, ceramics, cast aluminum, wrought aluminum, bronze, graphite resin, or combinations thereof.

In some embodiments, the carbon dioxide in the carrier liquid comprises dissolved carbon dioxide, entrained carbon dioxide, solid carbon dioxide, or combinations thereof.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 1A shows a process flow diagram showing one embodiment of the present invention.

FIG. 2A shows a process flow diagram showing one embodiment of the present invention.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1B:
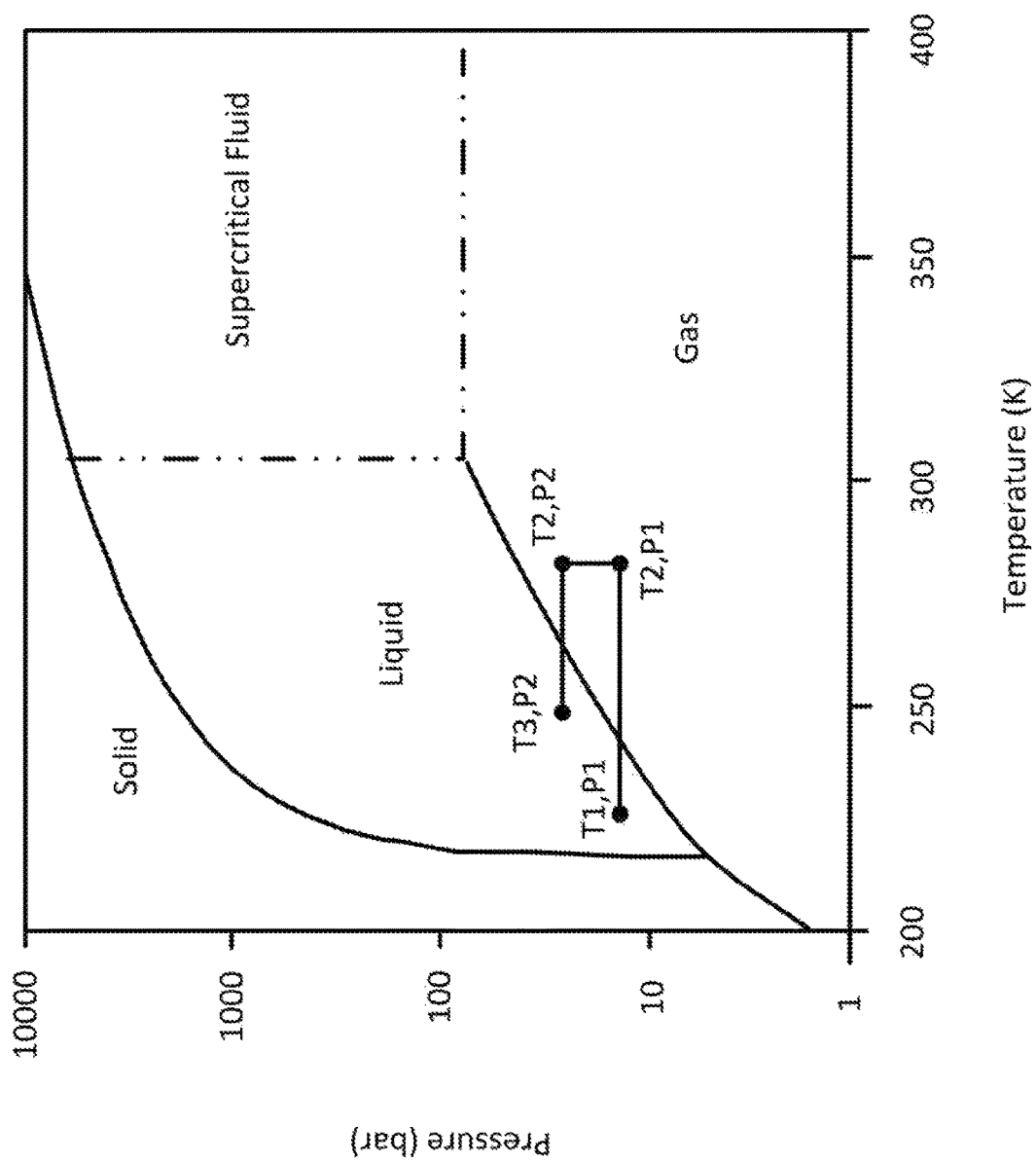
FIG. 1B shows a pressure/temperature phase diagram for carbon dioxide with one possible heat/compression path.

Referring to FIGS. 1A-B, a process flow diagram 100 in FIG. 1A shows one embodiment of the present invention, a method of removing carbon dioxide from a carrier liquid. FIG. 1B shows a pressure-temperature phase diagram for carbon dioxide, with one possible heat/compression path. Carrier liquid 102 enters heating input port 122 of heat exchanger 106 at first temperature T1 and first pressure P1 and is heated against compressed carbon dioxide gas 120. This heating causes carbon dioxide and at least a portion of carrier liquid 102 to vaporize to form carbon dioxide gas/carrier liquid vapor 112, leaving a depleted carrier liquid 114. The combination of carbon dioxide gas/carrier liquid vapor 112 and depleted carrier liquid 114 pass through heating output port 124 of heat exchanger 106 at second temperature T2 and into liquid removal vessel 108. The carrier liquid vapor is condensed out of carbon dioxide gas/carrier liquid vapor 112, leaving carbon dioxide gas 118, which passes out of of liquid removal vessel 108. The condensed carrier vapor combines with depleted carrier liquid 114 to drain from liquid removal vessel 108 and form carbon dioxide depleted carrier liquid 116 as a product. Carbon dioxide gas 118 is drawn through compressor 110 and is compressed to second pressure P2, forming compressed carbon dioxide gas 120. Compressed carbon dioxide gas 120 is sent to cooling inlet 128 of heat exchanger 106 and is cooled against carrier liquid 102 to third temperature T3. At this temperature, compressed carbon dioxide gas 120 condenses into pure carbon dioxide liquid 104, which leaves heat exchanger 106 through cooling inlet 126 as another product. In this embodiment, heat exchanger 106 is depicted as a counter-current brazed plate heat exchanger. In other embodiments, heat exchanger 106 may be a co-current heat exchanger. In other embodiments, heat exchanger 106 may be a different style heat exchanger, including aluminum plate, shell and tube, plate, plate and frame, plate and shell, spiral, or plate fin style heat exchanger. In this embodiment, the temperatures and pressures shown on FIG. 1B may be used. However, this should not be construed to limit the temperatures and pressures used in other embodiments. The limitations to the temperatures and pressures are as follows. The point (T1, P1) needs to be between the solid/liquid curve and the liquid/gas curve. It must be at a lower pressure than P2. The point (T2, P1) needs to be at a temperature higher than the liquid/gas curve sufficient that point (T2, P2) produced by compression is still in the gas phase. Point (T3, P2) needs to be at a temperature lower than the liquid/gas curve. In this manner, latent heats of vaporization and condensation are used to accomplish carbon dioxide removal with less energy input than would be required for traditional carbon dioxide removal processes. Compression, the largest energy consumer, is minimized by only compressing the gas enough to balance the heat exchange process.

Figure 2B:
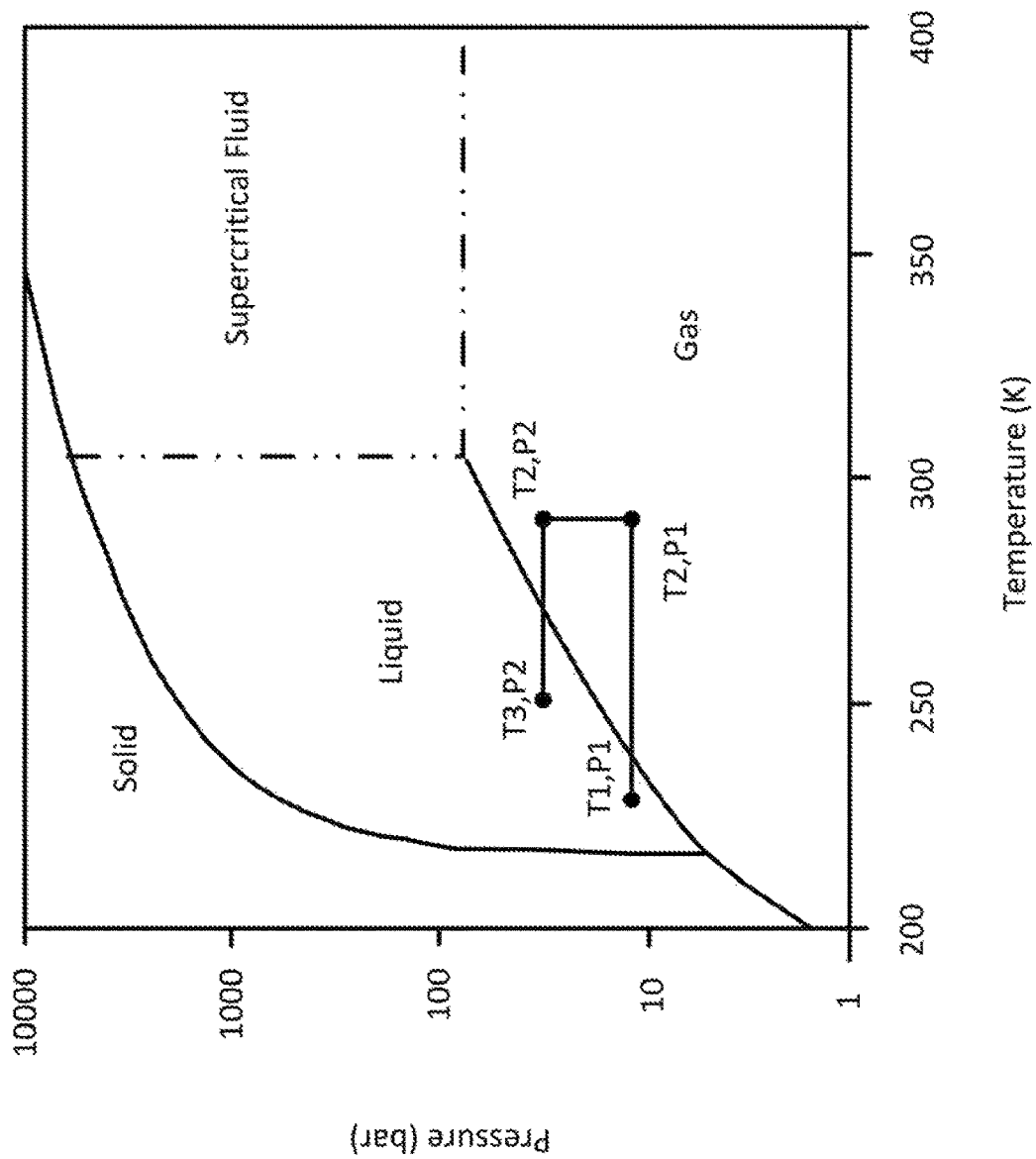
FIG. 2B shows a pressure/temperature phase diagram for carbon dioxide with one possible heat/compression path.

Referring to FIGS. 2A-B, a process flow diagram 200 in FIG. 1A shows one embodiment of the present invention, a method of removing carbon dioxide from a carrier liquid. FIG. 2B shows a pressure-temperature phase diagram for carbon dioxide, with one possible heat/compression path. Carrier liquid 202 enters heating input port 222 of heat exchanger 206 at first temperature T1 and first pressure P1 and is heated against compressed carbon dioxide gas 220. This heating causes carbon dioxide and at least a portion of carrier liquid 202 to vaporize to form carbon dioxide gas/carrier liquid vapor 212, leaving a depleted carrier liquid 214. The combination of carbon dioxide gas/carrier liquid vapor 212 and depleted carrier liquid 214 pass through heating output port 224 of heat exchanger 206 at second temperature T2 and into liquid removal vessel 208. The carrier liquid vapor is condensed out of carbon dioxide gas/carrier liquid vapor 212, leaving carbon dioxide gas 218, which passes out of liquid removal vessel 208. The condensed carrier vapor combines with depleted carrier liquid 214 to drain from liquid removal vessel 208 and form carbon dioxide depleted carrier liquid 216 as a product. Carbon dioxide gas 218 is drawn through compressor 210 and is compressed to second pressure P2, forming compressed carbon dioxide gas 220. Compressed carbon dioxide gas 220 is sent to cooling inlet 228 of heat exchanger 206 and is cooled against carrier liquid 202 to third temperature T3. At this temperature, compressed carbon dioxide gas 220 condenses into pure carbon dioxide liquid 204, which leaves heat exchanger 206 through cooling inlet 226 as another product. In this embodiment, heat exchanger 206 is depicted as a co-current brazed plate heat exchanger. In other embodiments, heat exchanger 206 may be a counter-current heat exchanger. In other embodiments, heat exchanger 206 may be a different style heat exchanger, including aluminum plate, shell and tube, plate, plate and frame, plate and shell, spiral, or plate fin style heat exchanger. In this embodiment, the temperatures and pressures shown on FIG. 2B may be used. However, this should not be construed to limit the temperatures and pressures used in other embodiments. The limitations to the temperatures and pressures are detailed in the previous paragraph.

In some embodiments, any surface of heat exchangers 106 and 206 exposed to the compressed carbon dioxide gas, 120 and 220, or the carrier liquid, 102 and 202, may be constructed of aluminum, stainless steel, polymers, carbon steel, ceramics, polytetrafluoroethylene, polychlorotrifluoroethylene, natural diamond, man-made diamond, chemical-vapor deposition diamond, polycrystalline diamond, or combinations thereof.

In some embodiments, liquid removal vessels 108 and 208 may contain packing materials. These packing materials may be structured or unstructured packing in the top third of the liquid removal vessel. In some instances, the inlet of liquid removal vessels 108 and 208 may be no higher than halfway up the liquid removal vessel. In some embodiments, the packing materials may be made of a material comprising stainless steel, hastelloy, titanium, nickel, copper, carbon steel, alumina, ceramics, polypropylene, polyethylene, polyvinylchloride, polyvinylidene fluoride, polyfluoroethylenepropylene, ethylene chlorotrifluoroethylene, polytetrafluoroethylene, polychlorotrifluoroethylene, natural diamond, man-made diamond, chemical-vapor deposition diamond, polycrystalline diamond, or combinations thereof.

In some embodiments, any surface of liquid removal vessels 108 and 208 exposed to the carrier liquid and the carbon dioxide gas may be constructed of aluminum, stainless steel, polymers, carbon steel, ceramics, polytetrafluoroethylene, polychlorotrifluoroethylene, natural diamond, man-made diamond, chemical-vapor deposition diamond, polycrystalline diamond, or combinations thereof.

In some embodiments, the carrier liquid may be 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

In one embodiment, first temperature T1 is between −145 C and −119 C, second temperature T2 is between 10 C and 45 C higher than first temperature T1, and third temperature T3 is between first temperature T1 and third temperature T3.

In some embodiments, the compression process may be conducted by a single compressor. In other embodiments, the compression step may be conducted by two compressors in series.

In some embodiments, the compressor may be a reciprocating, scroll, screw, rotary, sorbent, or centrifugal style compressor. In embodiments with two compressors in series, the compressors may be of the style or may be different styles. Any surface of the compressor or compressors exposed to carbon dioxide gas 218 may be stainless steel, ceramic, cast aluminum, wrought aluminum, bronze, graphite resin, or combinations thereof.

In some embodiments, the carbon dioxide in the carrier liquid may be dissolved carbon dioxide, entrained carbon dioxide, solid carbon dioxide, or combinations thereof.

The invention claimed is:

1. A method of removing carbon dioxide from a carrier liquid comprising:
   providing a heat exchanger with a cooling side and a heating side to conduct a heat exchange process between the carrier liquid and a compressed carbon dioxide gas; the cooling side of the heat exchanger having a cooling input port and a cooling output port; the heating side of the heat exchanger having a heating input port and a heating output port;
   conveying the carrier liquid to the heating input port, the carrier liquid being at a first temperature and a first pressure where the carbon dioxide is a carbon dioxide liquid;
   heating the carrier liquid through the heat exchanger, causing the carbon dioxide and a portion of the carrier liquid to vaporize as the carrier liquid and the carbon dioxide are brought to a second temperature where the carbon dioxide vaporizes to a carbon dioxide gas;

passing the carrier liquid and the carbon dioxide gas through the heating output port to a feed inlet of a liquid removal vessel;

removing a carbon dioxide depleted carrier liquid from the bottom of the liquid removal vessel;

compressing the carbon dioxide gas from the liquid removal vessel through a compression process by raising the carbon dioxide gas to a second pressure at which the carbon dioxide gas is now the compressed carbon dioxide gas;

sending the compressed carbon dioxide gas to the cooling input port; and cooling the compressed carbon dioxide gas by the heat exchange process with the carrier liquid through the heat exchanger, bringing the compressed carbon dioxide gas to a third temperature, by which process the carbon dioxide gas cools to a pure carbon dioxide liquid;

wherein, given a pressure-temperature curve for carbon dioxide, the first temperature and the first pressure are located in a liquid phase area of the pressure-temperature curve for carbon dioxide; the second temperature is shifted from the first temperature to the second temperature, the second temperature being higher than the first temperature, and the combination of the first pressure and the second temperature being located in a gas phase area of the pressure-temperature curve for carbon dioxide that also allows for the compression from the first pressure to the second pressure to keep the carbon dioxide gas as a gas; and the third temperature being lower than the second temperature, the third temperature and second pressure being in the liquid phase area; and, wherein the compression process is sized to allow the heat exchange process to be efficient by avoiding an inflection region that occurs between a heat-temperature curve of the cooling side of the heat exchanger and a heat-temperature curve of the heating side of the heat exchanger;

whereby carbon dioxide is removed from the carrier liquid.

2. The method of claim 1, wherein the heat exchanger is operated as a counter-current heat exchanger.

3. The method of claim 2, wherein the heat exchanger is a shell and tube style heat exchanger containing a shell enclosing a tube, wherein the tube has a varying diameter.

4. The method of claim 1, wherein the heat exchanger is operated as a co-current heat exchanger.

5. The method of claim 1, wherein the heat exchanger comprises a brazed plate, aluminum plate, shell and tube, plate, plate and frame, plate and shell, spiral, or plate fin style heat exchanger.

6. The method of claim 1, wherein any surface of the heat exchanger exposed to the compressed carbon dioxide gas or the carrier liquid comprises aluminum, stainless steel, polymers, carbon steel, ceramics, polytetrafluoroethylene, polychlorotrifluoroethylene, natural diamond, man-made diamond, chemical-vapor deposition diamond, polycrystalline diamond, or combinations thereof.

7. The method of claim 1, wherein the liquid removal vessel contains packing materials.

8. The method of claim 7, wherein the packing materials comprise structured or unstructured packing in the top third of the liquid removal vessel.

9. The method of claim 8, wherein the feed inlet of the liquid removal vessel is no higher than halfway up the liquid removal vessel.

10. The method of claim 7, wherein the packing materials are made of a material comprising stainless steel, hastelloy, titanium, nickel, copper, carbon steel, alumina, ceramics, polypropylene, polyethylene, polyvinylchloride, polyvinylidene fluoride, polyfluoroethylenepropylene, ethylene chlorotrifluoroethylene, polytetrafluoroethylene, polychlorotrifluoroethylene, natural diamond, man-made diamond, chemical-vapor deposition diamond, polycrystalline diamond, or combinations thereof.

11. The method of claim 1, wherein any surface of the liquid removal vessel exposed to the carrier liquid and the carbon dioxide gas comprises aluminum, stainless steel, polymers, carbon steel, ceramics, polytetrafluoroethylene, polychlorotrifluoroethylene, natural diamond, man-made diamond, chemical-vapor deposition diamond, polycrystalline diamond, or combinations thereof.

12. The method of claim 1, wherein the carrier liquid comprises 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

13. The method of claim 1, wherein the first temperature is between 56.5° C. and −30° C., the second temperature is between 10° C. and 45° C. higher than the first temperature, and the third temperature is between the first temperature and the second temperature.

14. The method of claim 1, wherein the compression process is conducted by a compressor.

15. The method of claim 14, wherein the compressor comprises a reciprocating, scroll, screw, rotary, sorbent, or centrifugal style compressor.

16. The method of claim 14, wherein any surface of the compressor exposed to the carbon dioxide gas comprises stainless steel, ceramics, cast aluminum, wrought aluminum, bronze, graphite resin, or combinations thereof.

17. The method of claim 14, wherein the two compressors comprise reciprocating, scroll, screw, rotary, sorbent, centrifugal, or a combination of styles of compressors thereof.

18. The method of claim 14, wherein any surface of the compressor exposed to the carbon dioxide gas comprises stainless steel, ceramics, cast aluminum, wrought aluminum, bronze, graphite resin, or combinations thereof.

19. The method of claim 1, wherein the compression step is conducted by two compressors in series.

20. The method of claim 1, wherein the carbon dioxide in the carrier liquid comprises dissolved carbon dioxide, entrained carbon dioxide, solid carbon dioxide, or combinations thereof.

* * * * *